(12) United States Patent
Bennett (10) Patent No.: US 8,032,182 B2
(45) Date of Patent: Oct. 4, 2011

(54) SUBSCRIBER IDENTITY MODULE WITH AN INCORPORATED RADIO

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 289 days.

(21) Appl. No.: 12/327,043

(22) Filed: Dec. 3, 2008

(65) Prior Publication Data

US 2010/0035587 A1 Feb. 11, 2010

Related U.S. Application Data

(60) Provisional application No. 61/086,881, filed on Aug. 7, 2008.

(51) Int. Cl.
 *H04M 1/00* (2006.01)
(52) U.S. Cl. ........ 455/558; 455/88; 455/90.1; 455/90.3; 455/186.2; 455/553.1
(58) Field of Classification Search ............... 45/414.1, 45/344, 550.1; 455/186.2, 88, 553.1, 90.1, 455/90.3, 558
See application file for complete search history.

(56) References Cited

U.S. PATENT DOCUMENTS

| | | | |
|---|---|---|---|
| 2004/0180657 A1* | 9/2004 | Yaqub et al. | 455/435.1 |
| 2008/0162312 A1* | 7/2008 | Sklovsky et al. | 705/35 |
| 2008/0305815 A1* | 12/2008 | McDonough | 455/466 |
| 2009/0106366 A1* | 4/2009 | Virtanen et al. | 709/206 |
| 2010/0273424 A1* | 10/2010 | De Petris et al. | 455/41.2 |

FOREIGN PATENT DOCUMENTS

| | | |
|---|---|---|
| DE | 10200278 A1 | 7/2003 |
| EP | 1777781 A1 | 4/2007 |
| WO | 2006/056220 A | 6/2006 |
| WO | 2009/083016 A | 7/2009 |

OTHER PUBLICATIONS

European Search Report:EP Application No. 09009737.9-1244;dated Nov. 16, 2009.

* cited by examiner

*Primary Examiner* — Kamran Afshar
*Assistant Examiner* — Khalid Shaheed
(74) *Attorney, Agent, or Firm* — Garlick, Harrison & Markinson; Kevin L. Smith (57) ABSTRACT

A communication system includes a phone and a Subscriber Identity Module (SIM). The phone includes a user input interface, a first wireless transceiver and a first application program interface. The SIM is plugged into the phone and includes storage, a second wireless transceiver, and a second application program interface. The phone uses a service-subscriber key stored in the storage of the SIM to access a plurality of services provided by a wireless network using the first transceiver according to a first communication protocol. The first application program interface, in response to a user selection via the user input interface, interacts with the second application program interface. The phone communicates with a node using the second wireless transceiver according to a second communication protocol by way of the interaction between the first application program interface and the second application program interface.

15 Claims, 7 Drawing Sheets

FIG. 7 though comparison of such systems with
SUBSCRIBER IDENTITY MODULE WITH AN INCORPORATED RADIO

CROSS REFERENCES TO RELATED APPLICATIONS

The present U.S. Utility patent application claims priority pursuant to 35 U.S.C. §119(e) to the following U.S. Provisional patent applications which are hereby incorporated herein by reference in their entirety and made part of the present U.S. Utility Patent Application for all purposes:

1. U.S. Provisional Application Ser. No. 61/086,881, entitled "Subscriber Identity Module with an Incorporated Radio," filed Aug. 7, 2008.

BACKGROUND OF THE INVENTION

1. Field of the Invention

The present invention relates to wireless telephony; and more particularly to Subscriber Identity Module (SIMs) contained within wireless telephones.

2. Description of the Related Art

Cellular, satellite, and other types of mobile telephony are well known. Cell phones and other subscribe devices typically include a removable Subscriber Identity Module (SIM) that stores a service-subscriber key that is used for authentication and identification of a subscriber within a cellular network or a satellite network when the subscriber accesses the cellular or satellite network. A cellular network operator typically offers voice call service, data communication service and short message service (SMS). Each mobile phone has one or more cellular network specific transceivers that service voice, data, and short message communications. For example, a transceiver that supports connection to a GSM (Global System for Mobile communication) cellular network is different from a transceiver that supports connection to a North American CDMA (Code Division Multiple Access) cellular network.

Mobile phones may support a variety of additional features such as GPS (Global Positioning System) receiver operations, NFCs (Near Field Communications), Bluetooth communications, FM radio reception, Infrared communications, etc. Typically, the mobile phone must have built-in hardware and software to support these additional features. For example, when enabling communication with other Bluetooth devices, the mobile phone must have a Bluetooth compatible transceiver, i.e., a transceiver that supports the Bluetooth air interface. For enabling GPS operations, the phone must have a GPS receiver that is capable of picking up frequencies transmitted by GPS satellites. The mobile phone needs a NFC compatible radio for near field communications with a reader, smart card, or another NFC device. The phone needs an infrared transceiver, i.e., an LED (light emitting diode) and supporting electronics to support short range IR (Infrared) data communications with a computer or a PDA (personal digital assistant). Hardware that supports these additional features is costly. The subscriber has to pay for a costly phone with multiple additional features even if the subscriber desires to have only one or two of these features. Furthermore, a subscriber desiring a feature unsupported by his/her current phone must upgrade to new equipment in order to secure the additional functional features.

Further limitations and disadvantages of conventional and traditional approaches will become apparent to one of ordinary skill in the art through comparison of such systems with various aspects of the present invention.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
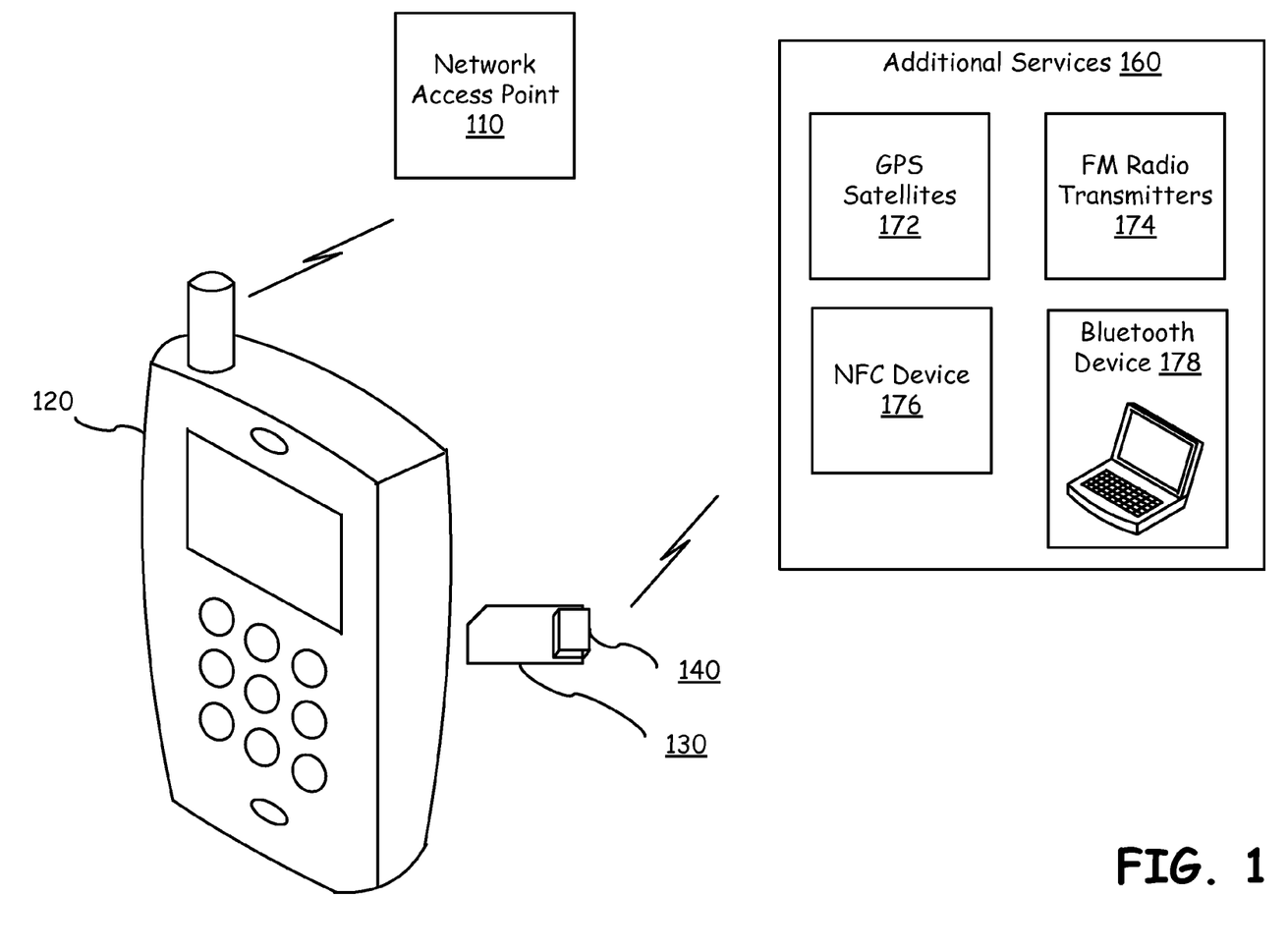
FIG. 1 is a block diagram illustrating a mobile phone that supports a plurality of additional services via a radio on a Subscriber Identity Module (SIM) that is plugged into the phone in accordance with various aspects of the present invention.

FIG. 1 is a block diagram illustrating a mobile phone that supports a plurality of additional services via a radio on a Subscriber Identity Module (SIM) that is plugged into the phone in accordance with various aspects of the present invention. The phone 120 receives the plurality of additional services via a radio 140 of the SIM 130 that is plugged into the phone 120. The phone 120 is one of a cellular phone or a satellite phone or another type of wireless phone that supports subscription service. A user subscribed to a cellular/satellite radio network accesses a plurality of services provided by the cellular/satellite radio network by using the cellular/satellite phone 120. The cellular/satellite phone 120 comprises a cellular/satellite radio, a memory, a screen, a user input interface, a speaker, a microphone and is adapted to communicate with the cellular/satellite radio network using the cellular/satellite radio. The cellular/satellite radio is a transceiver that transmits and receives signals over a band of frequencies designated for cellular/satellite communication. The SIM 130 remains plugged into the phone 120 during operation and stores a service-subscriber key in a memory of the SIM 130. The phone 120 uses the service-subscriber key stored in the SIM 130 to identify itself with the communication network (cellular/satellite communication network) via an access point 110. Upon identification, the cellular/satellite radio network authenticates the phone 120 to access one or more of the plurality of services provided by the cellular/satellite radio network. The plurality of services are typically, for example and without limitation, voice call service, data service, and short message service.

In another embodiment, the phone 120 is a cellular phone and the radio 140 of the SIM 130 is, for example and without limitation, a FM receiver. The radio 140 is a RF (Radio Frequency) receiver that is adapted to pick up signals transmitted by FM radio stations. The cellular radio of the cellular phone (handset) 120 is adapted to pick up signals transmitted by another cellular radio, and cannot pick up signals transmitted by FM radio stations because FM radio and cellular radio operate over different frequency band. The SIM 130 includes a first extended API (Application Program Interface) software in addition to the FM receiver 140. The cellular phone 120 receives second extended API software from a website via a computer, from the SIM 130, or from a variety of external sources. The cellular phone 120 stores the second extended API in the memory of the phone 120. The second extended API interacts with the user input interface of the cellular phone 120 such that a user can use the cellular phone 120 to operate the FM receiver 140 on the SIM 130 that remains inserted into the cellular phone 120. For example, the user input interface of the cellular phone 120 may be a keypad and the second extended API designates a couple of keys of the keypad for switching on, switching off and tuning of the FM receiver 140 to different FM radio stations. The user is able to operate the FM radio 140 using the couple of designated keys of the keypad. In another embodiment the user input interface is a touch-screen. In still another embodiment the second API installs an icon corresponding to the FM radio and/or adds an item corresponding to the FM radio to a list of available features on the cellular phone 120. The user operates the FM radio by selecting the installed icon and/or selecting the installed item from the list of available features.

The second extended API interacts with the first extended API that is stored in the SIM 130 when the user selects one of the designated keys or selects the icon corresponding to the FM radio 140. The second extended API requests the first extended API to turn on the FM receiver 140 in response to the user selecting a button designated as 'turn on' button for the FM radio 140. The first extended API, in response to the request, turns on the FM radio receiver 140 and directs signal picked up by the FM receiver 140 to the cellular phone 120. The second extended API further directs the signal picked up by the FM radio 140 receiver to the microphone of the cellular phone 120.

As an example, and without limitation, a user subscribes to voice and data services provided by a cellular network operator. The user purchases the SIM 130 with an FM radio 140 incorporated into the SIM 130 from the operator. The SIM 130 has a service-subscriber key and the first extended API stored in a memory of the SIM 130. The SIM 130 when plugged into the cellular phone 120 allows the cellular phone 120 to use the service-subscriber key to identify itself with the cellular network. After identification the cellular phone 120 is authenticated by the cellular network operator to use the voice and data services provided by the cellular network operator. In order to operate the FM radio on the SIM 130, the user downloads the second extended API from the operator's website on a personal computer or notebook and subsequently transfers the second extended API to the cellular phone 120 using a tethered connection. The second extended API installs additional control options, for example, radio turn on, radio turn off, radio channel change etc. on the phone 120. The user uses the additional control options to operate the FM radio 140 on the SIM 130. Signal transmitted by FM radio transmitters 174 is received by the FM receiver 140 and the received signal is heard through the microphone on the phone 120. The cellular phone 120, in spite of not having a FM receiver built into the phone 120, receives FM radio stations via the FM radio 140 on the SIM 130 that is plugged into the cellular phone 120. The first extended API in the SIM 130 interacts with the second extended API in the phone 120 to enable operation of the FM radio on the SIM using the user input interface of the cellular phone 120.

The radio 140 on the SIM 130 may be, for example, one of GPS receiver, a Bluetooth radio, a NFC (Near Field Communication) compatible radio etc. The cellular phone 120 receives signals from GPS satellites 172 via the radio 140 on the SIM 130 when the SIM 130 is plugged into the phone 120 if the radio 140 is a GPS receiver. The cellular network operator or the manufacturer of the SIM 130 with the radio 140 or a third party provides the second extended API for the phone 120. In another embodiment, the phone 120 is a satellite phone and the phone 120 communicates with satellites by operating over satellite frequency band. The phone 120 is in addition adapted to communicate with Bluetooth enabled device 178 if a SIM with a Bluetooth radio 140 is plugged into the satellite phone 120. The phone 120 receives and sends information to the Bluetooth enabled device 178 via the Bluetooth radio 140 on the SIM 130. If the radio 140 on the SIM 130 can receive and transmit signals pursuant to NFC then the phone 120 communicates with a NFC compatible device 176 via the radio 140. The phone 120 communicates with communication network (cellular network or satellite network) to which the phone 120 has subscribed using the radio on the phone 120. The phone 120 with the SIM 130 plugged into the phone 120 can have access to a variety of additional services 160 depending on type of radio 140 on the SIM 130.

The radio 140 on the SIM 130 is one or more of a GPS receiver, a FM receiver, a NFC radio, a Bluetooth radio etc. A cellular network or a satellite network necessitates identification and authentication of a cellular phone or a satellite phone using a service-subscriber key that is stored in the SIM prior to allowing the cellular/satellite phone to access services provided by the cellular/satellite network. The SIM is a required component of the cellular/satellite phone. GPS architecture, FM radio network, NFC compatible devices or Bluetooth compatible devices do not call for authentication of a GPS receiver/FM receiver/NFC radio/Bluetooth radio prior to communication with another radio of similar type. A GPS receiver, a FM receiver, a NFC device, and a Bluetooth device do not need a SIM. Operation and business model of a cellular/satellite network is different from operation and business model of a FM radio network, Bluetooth devices, NFC devices and GPS devices.

Figure 2:
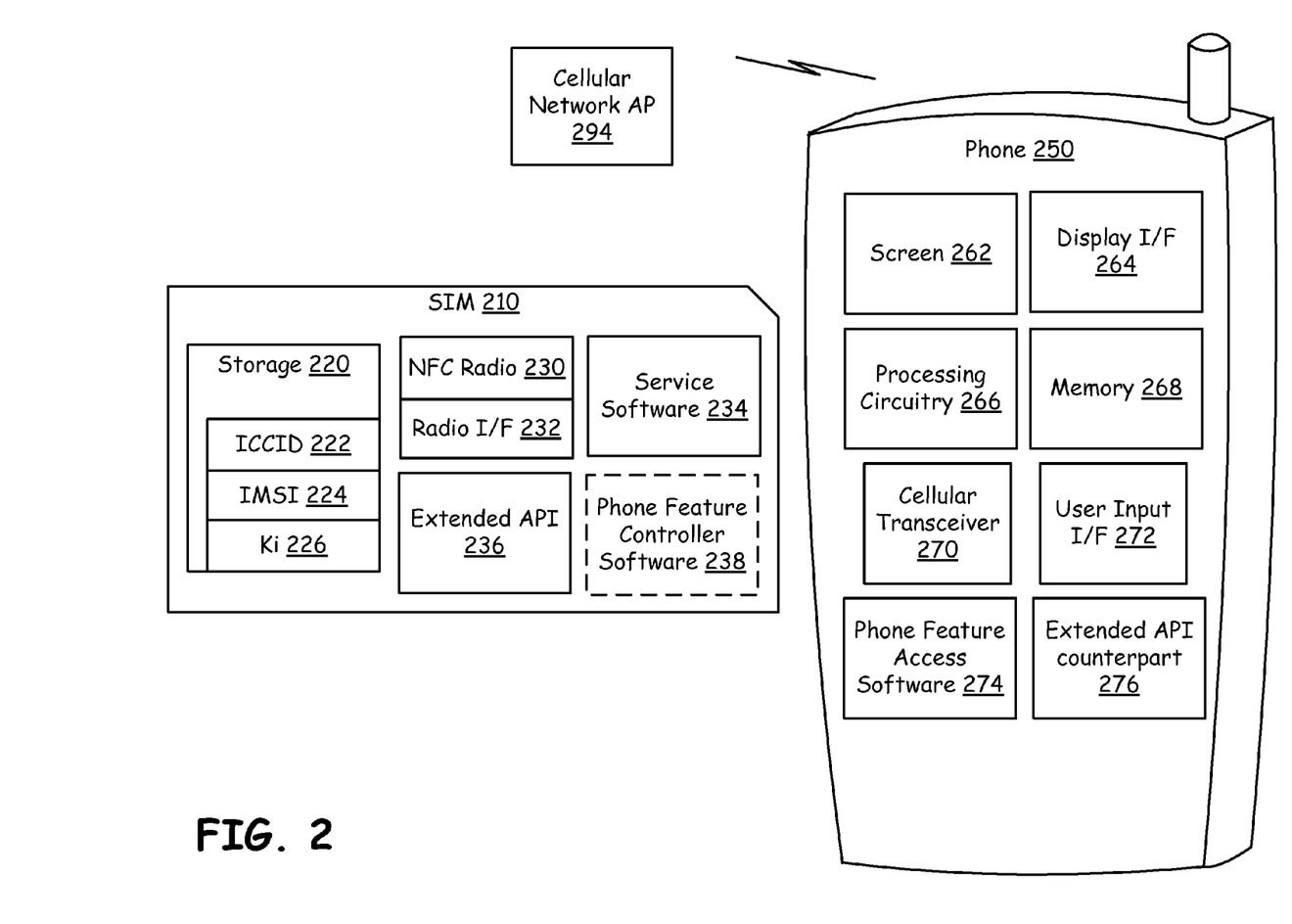
FIG. 2 is a block diagram illustrating additional hardware and software modules present in a cellular phone and a SIM that enables the cellular phone access to a plurality of additional services according to one or more embodiments of the present invention.

FIG. 2 is a block diagram illustrating additional hardware and software modules present in a cellular phone and a SIM that enables the cellular phone access to a plurality of additional services according to one or more embodiments of the present invention. The hardware and software modules present in a cellular phone 250 and the SIM 210 enable the cellular phone 250 to access the plurality of additional services via the radio 140 on the SIM 130. The cellular phone 250 includes a screen/display 262, a display I/F (interface) 264, processing circuitry 266, memory 268, a cellular transceiver 270, a user input I/F 272 and phone feature access software 274. The user input I/F 272 is typically a keypad. In one embodiment the screen 262 is a touch screen and functions as the user input I/F of the cellular phone 250 in addition to the keypad 272. The cellular transceiver 272 is adapted to transmit and receive signals over a predefined band of frequencies corresponding to cellular network operation. The cellular phone 250 communicates with an access point/base station 294 via the cellular transceiver 272. The access point 294 is communicatively connected to a backbone cellular network.

The SIM 210 includes storage 220 upon which an ICCID (Integrated Circuit Card ID) 222 that identifies the SIM 210, IMSI (International Mobile Subscriber Identity) 224 that identifies a network operator who issues the SIM 210, and a Ki (authentication key) 226 that is used by the SIM 210 during authentication process of the phone 250 are stored. Service software 234 includes code that is required by the SIM 210 to perform subscriber management functionality for example that generate keys during authentication of the phone 250 by a cellular network, storing location information of the phone 250 and updating the location information when the phone 250 changes its location etc.

The SIM 210 in addition includes a radio 230, a radio I/F 232 and an extended API 236. The radio 230 is one or more of a receiver and a transmitter. For example, the radio 230 may be a satellite radio receiver. Satellite radios operate over a band of frequencies that is different from the band of frequencies over which the cellular transceiver 270 operates. The extended API 236 is a component that enables the SIM 210 to manage interaction of the radio 230 with the phone 250 when the SIM 210 is plugged into the phone 250. The SIM 210 may optionally include phone feature controller software 238.

The cellular phone 250 must authenticate itself with a cellular network prior to using services provided by the cellular network. Authentication processes start with the cellular phone 250 retrieving IMSI 224 from the SIM 210, that is plugged into the phone 250, and sending the IMSI 224 to the access point 294 using the cellular transceiver 270. The cellular phone 250 subsequently passes information received from the access point 294 via the transceiver 270 to the SIM 210 and vice versa. Once authentication is successful, the cellular phone 250 receives the location information from the access point 294 and passes the location information to the SIM 210 for storing in the storage 220. The cellular phone sends and receives short message, voice, and data from the access point 294 via the transceiver 270. The extended API 236 looks for its counterpart in the phone 250. The SIM 210, in one embodiment, displays a message on the screen 262 of the phone 250 if the counterpart of the extended API 236 is not available in the phone 250. The SIM 210 uses the phone feature controller software 238 to access the screen 262 of the phone 250.

The phone 250 receives an extended API counterpart 276 from one or more of a storage device via a tethered connection, a website via the access point 294 and cellular transceiver 270, cellular network operator's server via the access point 294 and the cellular transceiver 270 etc. The extended API counterpart 276 is a code that interacts with the phone feature access software 274 and the extended API 236. The extended API counterpart 276 directs a way to operate the radio 230 on the SIM 210 via the user input I/F 272 of the phone 250. If the user input I/F 272 is a plurality of keys, the extended API counterpart 276 identifies a few of the plurality of keys of the user input I/F 272 for operating the radio 230. For example and without limitation the radio 230 may be a NFC compatible transceiver. The extended API counterpart 276 identifies keys from the user input I/F 272 that actuate 'receive', 'send', 'stop' functionalities in the radio 230. If the user input I/F 272 of the phone 250 is a touch screen, the extended API counterpart 276 directs an item or icon corresponding to the radio 230 to be added to a list of available features in the phone 250. A user browsing the list of available features uses the newly added item or icon to operate the radio 230 on the SIM 210 using the touch screen 262 of the phone 250.

As an example, a user selects a key corresponding to the 'receive' functionality of the radio 230 from the user input I/F 272. The extended API counterpart 276, in response to the user selection, sends a request to the extended API 236 to set the radio 230 in receive mode. The extended API 236, in response to the request, directs the radio 230 to receive data from an external source. The extended API 236 further directs the radio 230 to pass received data to the processing circuitry 266 of the phone 250. The processing circuitry 266, in pursuance to direction from the extended API counterpart 276, stores the received data in the memory 268 of the phone or processes the received data for future use. The legacy cellular phone 250, in spite of not having a NFC radio built into it, communicates with NFC compatible devices using the radio 230 on the SIM 210 that is plugged into the cellular phone 250.

Figure 3:
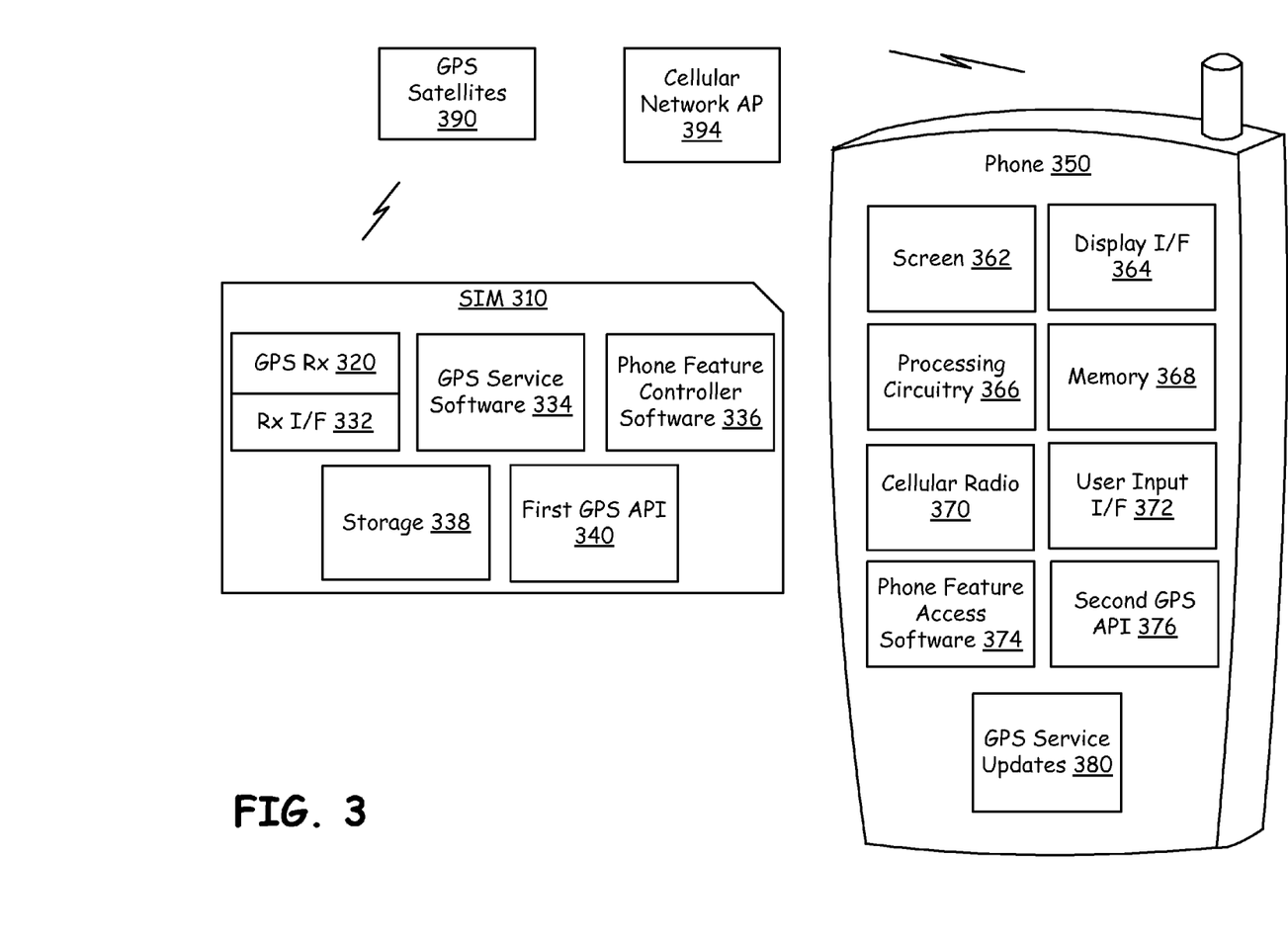
FIG. 3 is a block diagram illustrating additional hardware and software modules present in a cellular phone and a SIM that enable the cellular phone to access GPS service according to one or more embodiments of the present invention.

FIG. 3 is a block diagram illustrating additional hardware and software modules present in a cellular phone and a SIM that enable the cellular phone to access GPS service according to one or more embodiments of the present invention. The additional hardware and software modules present in the cellular phone 120 and the SIM 130 enable the cellular phone 120 to access GPS service such as that described with reference to FIG. 1. The SIM 310 is plugged into the cellular phone 350. The phone 350 uses information stored in storage 338 of the SIM 310 to identify itself with a cellular network. Upon identification the cellular phone 350 communicates with the cellular network via an access point 394 using a cellular radio 370. The phone 350 is adapted to access a plurality of services provided by the cellular network operator via the access point 394. The plurality of services includes, for example and without limitation, voice service, data service, and short message service.

The SIM 310 includes additional hardware including for example a GPS (global positioning system) receiver 320 and additional software, such as a receiver I/F 332, GPS service software 334, a first GPS API 340 and phone feature controller software 336. The phone feature controller software 336 is independent of the additional hardware and may be independent of the additional software. The GPS receiver 320 is adapted to receive signals from GPS satellites 390. The GPS service software 334 is adapted to determine a location of the SIM 310 based on the signal received from the GPS satellites 390 by the GPS receiver 320. The first GPS API 340 allows the cellular phone 350 to access the signal received by the GPS receiver 320 or to interact with the GPS service software 334. The phone feature controller software 336 interacts with user input I/F 372 of the phone 350 to modify a list of available features on the phone 350. The additional hardware and the additional software are built into the SIM 310 by a SIM manufacturer. The cellular network operator writes network specific information into the storage 338 of the SIM 310. A user of the cellular phone 350, which cannot access GPS service as the phone 350 does not have a GPS receiver, buys the SIM 310 from the cellular network operator and plugs the SIM 310 into the cellular phone 350. The phone 350 uses the network specific information stored in the storage 338 of the SIM 310 to identify itself with the cellular network, every time the phone 350 wants to access one or more of the plurality of services provided by the cellular network.

The phone 350 needs additional software: a second GPS API 376 to interact with the GPS service software 334 and to receive the signal received by the GPS receiver 320. The phone 350 receives the second GPS API 376 from a storage device via a tethered connection or the cellular network operator via the access point 394. The storage device is one or more of a compact disc, USB (universal serial bus) storage, memory of a computer, etc. The second GPS API 376 is copied from the storage device to a memory 368 of the phone 350 via, for example, a notebook computer. The phone 350, in another embodiment, receives the second GPS API 376 from the SIM manufacturer's remote server by using packet data service provided by the cellular network operator. The second GPS API 376 enables the phone 350 to control the GPS receiver 320 on the SIM 310.

The first GPS API 340 searches for a second GPS API in the phone 350 when the SIM 310 is plugged into the cellular phone 350. Upon detecting presence of the second GP API 376 in the phone 350, the first GPS API 340 directs the phone feature controller software 336 to modify the list of available features on the phone 350. The phone feature controller software 336 interacts with the second GPS API 376 and adds an item to the list. A user on selecting the newly added item from the list of available features, accesses the GPS service. The phone feature controller software 336 interacts with the second GPS API 376 to further add sub-items to the item corresponding to the GPS service. The user is able to, for example and without limitation, turn on the GPS receiver 320, turn off the GPS receiver 320, see location information generated by the GPS service software 334 on a screen 362 via a display interface 364 and processing circuitry 366 of the phone 350, receive GPS service updates via the GPS receiver 320, store the GPS service updates 380 in the memory of the phone 350, by selecting one or more of the sub-items. The phone feature controller software 336 interacts with the second GPS API 376 via the first GPS API 340. The second GPS API 376 passes on directions corresponding to addition of item and/or sub-items to the list of available features from the first GPS API 340 to phone feature access software 374. For example, the user selects a sub-item corresponding to display of location information on the screen 362. The second GPS API 376 requests the first GPS API 340 to send the location information to the phone 350 in response to the user selection. The first GPS API 340 retrieves the location information from the GPS service software 334 and forwards the retrieved location information to the second GPS API 376. The second GPS API 376 directs the phone feature access software 374 to display the location information on the screen 362. The phone feature access software 374, in response to the direction, displays the location information received from the SIM 310 on the screen 362. The GPS service software 334 determines location of the SIM 310 (i.e., the phone 350) based on signal received by the GPS receiver 320. In yet another embodiment the GPS service software resides in the phone 350 thereby saving the SIM 310 from processing functionality. The phone 350 receives the GPS service software from a storage device via a tethered or a wireless connection. The storage device is one or more of a compact disc, a web server, a USB memory etc.

Figure 4:
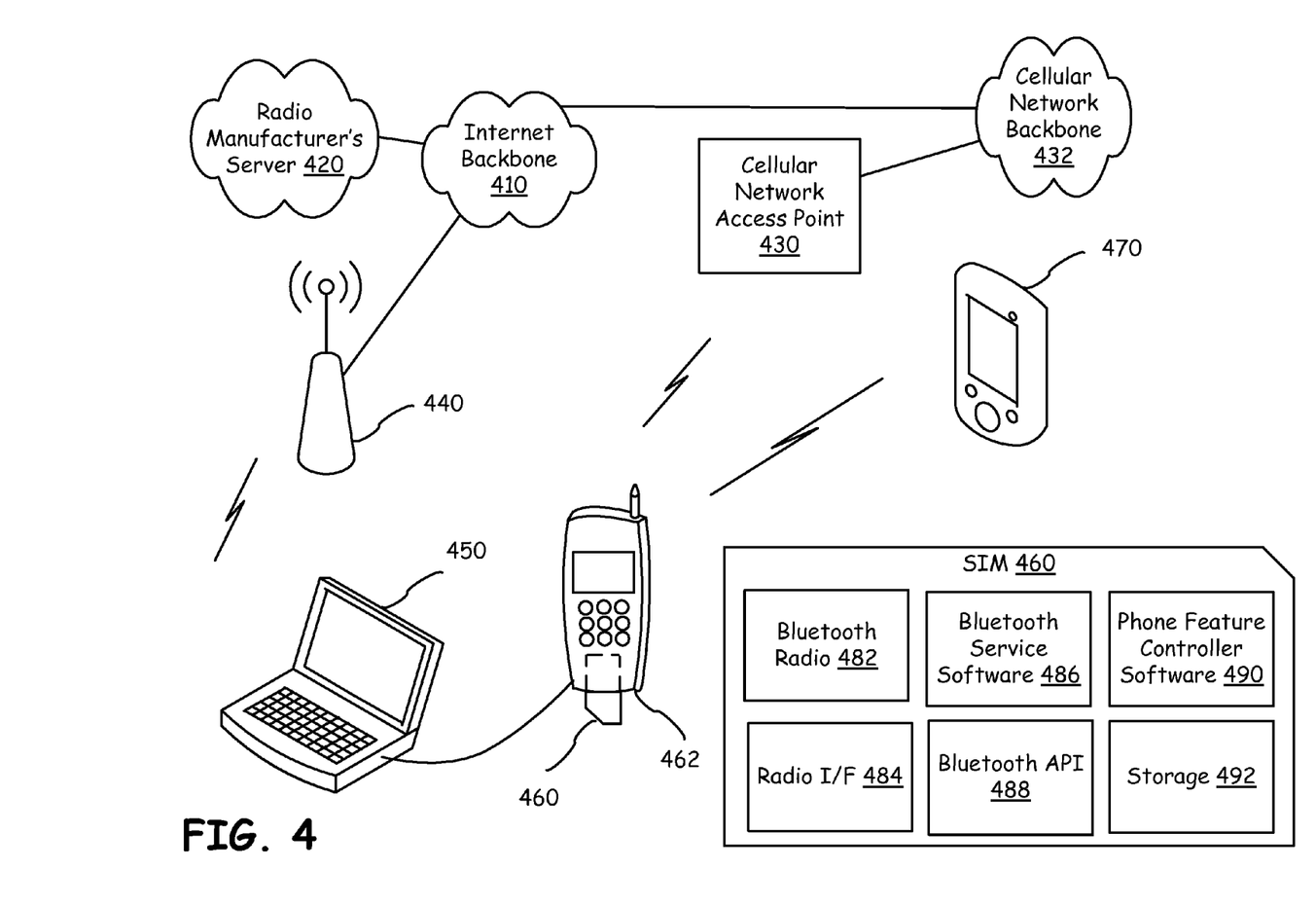
FIG. 4 is a block diagram illustrating interaction of a cellular phone with a Bluetooth device via a radio on a SIM of the cellular phone according to one or more embodiments of the present invention.

FIG. 4 is a block diagram illustrating interaction of a cellular phone with a Bluetooth device via a radio on a SIM of the cellular phone according to one or more embodiments of the present invention. The cellular phone 462 interacts with a Bluetooth device 470 via a radio 482 of a SIM 460 wherein the cellular phone 462 receives software necessary to operate the radio 482 from a storage device. The SIM 460 includes a storage 492 that stores cellular network specific and subscriber specific information. The SIM 460 remains inserted into the phone 462 so that the cellular phone 462 has access to the cellular network specific and the subscriber specific information always. The cellular phone 462 uses the cellular network specific and the subscriber specific information stored in the SIM 460 to identify itself with the cellular network before the phone 462 accesses a plurality of services offered by the cellular network. The cellular phone 462 includes a transceiver that is adapted to transmit and receive signals over a band of frequencies designated for cellular network operation. The phone 462 sets up a first wireless communication link with a first access point 430 and communicates with the first access point 430 over the first wireless link using the transceiver.

The SIM 460 includes a Bluetooth radio 482, a radio I/F 484, Bluetooth service software 486, Bluetooth API 488 and phone feature controller software 490. The cellular phone 462 may communicate with Bluetooth enabled devices using the Bluetooth radio 482 on the SIM 460 provided the phone 462 has an API (application program interface) or software on the phone 462 that interacts with the Bluetooth API 488 on SIM's side for operating the Bluetooth radio 482. The cellular phone 462 retrieves the phone's side API from storage via a tethered and/or a wireless connection. For example, the phone's side API is stored in a web server 420 that belongs to the Bluetooth radio's manufacturer. A user of the phone 462 receives the phone's side API on a notebook 450 from the web server 420 via a second wireless link. The notebook 450 is adapted to receive data packets from a second access point 440 via the second wireless link using an IEEE 802.11x protocol. The second access point 440 is communicatively connected to the web server 420 via Internet backbone 410. The cellular phone 462 is tethered to the notebook 450. The phone 462 receives the phone's side API from the notebook 450 via the tethered connection.

In another embodiment the phone 462 receives the phone's side API from the first access point 430 via the first wireless link. The first access point 430 is communicatively coupled to the web server 420 via the cellular network backbone 432 and the Internet backbone 410. The cellular phone 462 receives the phone's side API from the first access point 430 if the cellular phone 462 is subscribed to packet data service offered by the cellular network. In yet another embodiment the phone's side API is stored in a second web server that belongs to the cellular network operator. The cellular phone 462 receives the phone's side API from the second web server via the first access point 430 and over the first wireless link in the yet another embodiment. The phone's side API may be alternately stored in a compact disc. The phone 462 does not have a disc reader and therefore the phone 462 retrieves the phone's side API from the compact disc via the notebook 450 that includes a compact disc reader.

The phone 462, equipped with the phone's side API is able to interact with the SIM's side API 488 to operate and control the Bluetooth radio 482. The phone's side API along with the SIM's side API 488 and the phone feature controller software 490 modifies user input I/F of the phone 462 such that the Bluetooth radio 482 can be operated and controlled using the user input I/F. The user input I/F of the phone 462 is one or more of a plurality of keys, a touch screen etc. The Bluetooth radio manufacturer releases updates and/or newer versions of the phone side's API and/or the SIM's side API 488. The phone 462 retrieves the updates and/or newer versions of the two APIs (the phone side's API and/or the SIM's side API 488) from the web server 420 via the notebook 450. The phone 462 may alternately receive such updates and/or newer versions of the two APIs from the first AP 430 using the cellular transceiver on the phone 462. The phone 462 sends the updates and/or newer versions of the SIM's side API 488 to the SIM 460.

Figure 5:
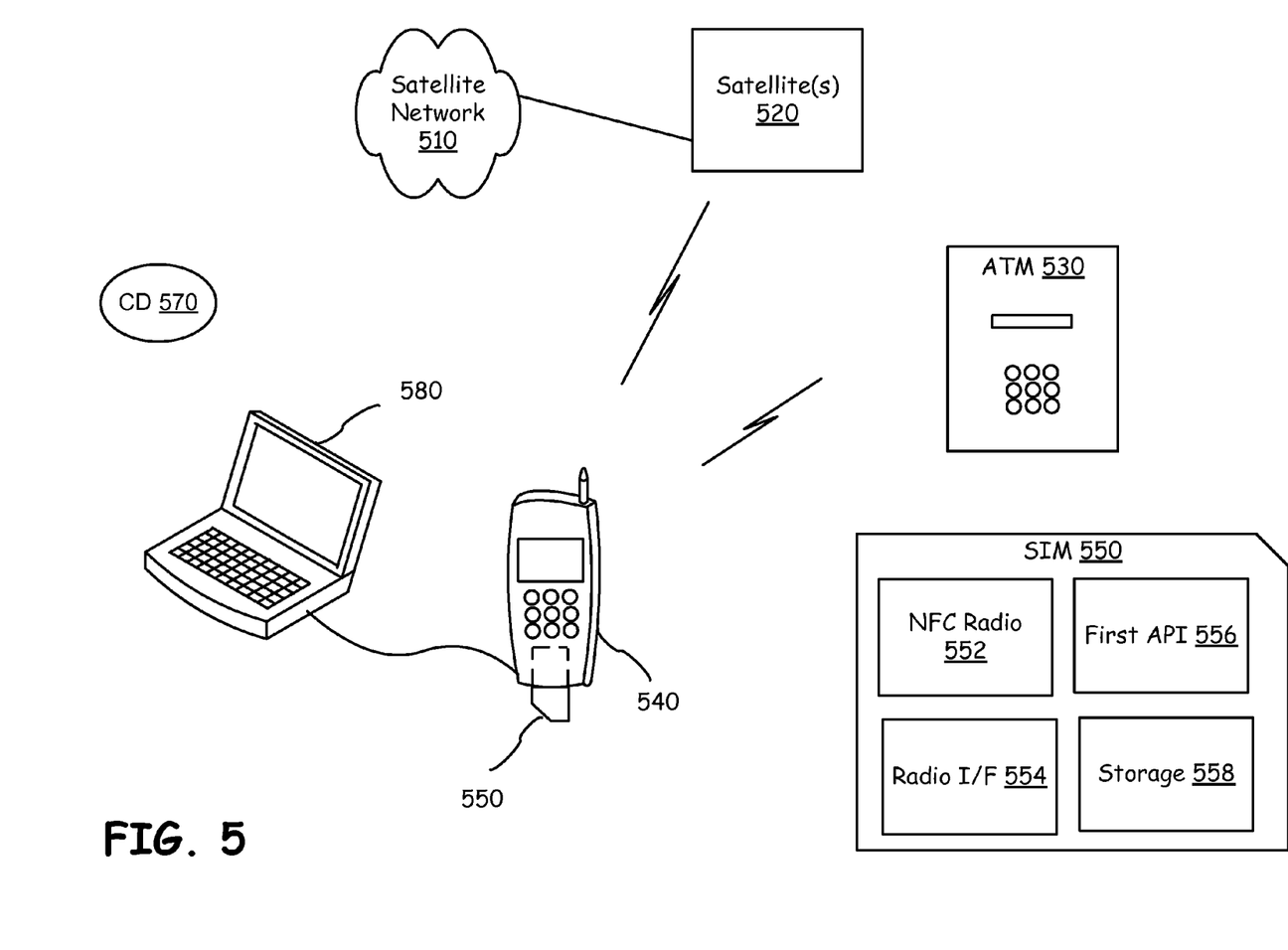
FIG. 5 is a block diagram illustrating interaction of a satellite phone with a Near Field Communications (NFCs) device via a NFC compatible radio of a SIM that is plugged into the satellite phone according to one or more embodiments of the present invention.

FIG. 5 is a block diagram illustrating interaction of a satellite phone with a NFC device via a NFC compatible radio of a SIM that is plugged into the satellite phone according to one or more embodiments of the present invention. The satellite phone 540 communicates with a NFC device 530 via a NFC compatible radio 552 on a SIM 550 that is plugged into the satellite phone 540. The satellite phone 540 includes a transceiver that is adapted to receive data from a satellite 520 and send data to the satellite 520. The satellite phone 540 is adapted to communicate with all satellites that belong to the satellite network 510 using the transceiver though the phone 540 is adapted to communicate with one satellite at a time. Data is one or more of voice data, packet data, short messages etc. The satellite phone 540 can communicate with the satellite 520 after the satellite network 510 authenticates the satellite phone 540. The satellite phone 540 retrieves user-subscription data from storage 558 of the SIM 550 and sends the user-subscription data to the satellite 520 during authentication. The SIM 550 remains plugged into the satellite phone 540 thereby enabling the satellite phone 540 to access the user-subscription data. The satellite phone 540 starts communication with the satellite 520 over a first wireless link after successful authentication by the satellite network 510. The satellite phone 540 stores network specific information in the storage 558 of the SIM 550. The satellite phone 540 uses the user-subscription data and the network specific information every time the satellite phone starts a communication call with the satellite 520 or any other satellite belonging to the satellite network 510.

The SIM 550 includes a NFC radio 552, a radio I/F 554, and a first API 556. The NFC radio 552 is adapted to send and receive data to/from a second NFC radio at a distance of a few centimeters to a few meters as compared to the transceiver on the satellite radio 540 that communicates with the satellite 520 over a distance of hundreds of kilometer. The NFC radio 552 and the transceiver (not shown in the figure) on the satellite phone 540 follow different protocols for communication over wireless links. A user may like to operate the NFC radio 552 using input I/F of the satellite phone 540. The input I/F of the satellite phone 540 is one or more of a keypad, a screen, a touch-screen and a pen etc. The satellite phone 540 needs a second API to use the input I/F of the satellite phone 540 for operating the NFC radio 552 on the SIM 550. The satellite phone 540 looks for the second API when the SIM 550 is inserted into the satellite phone 540. In one embodiment the second API is stored in a compact disc 570. Manufacturer of the NFC radio 552 supplies the compact disc 570 to the user. The user transfers the second API from the compact disc 570 to a notebook 580 and subsequently transfers the second API from the notebook 580 to the satellite phone 540 via a tethered connection. The second API may be available in a variety of storage devices, for example, USB storage, DVD etc.

The second API is a code that interacts with the first API 556 to ensure that the NFC radio 552 can be operated using input I/F of the satellite radio 540. The first API 556 is another code that interacts with the NFC radio I/F 554. The second API interacts with phone feature access software that is stored in the phone 540. The second API directs the phone feature access software to add an item/icon to a list of available features in the phone 540 and/or designate one or more keys from the keypad of the phone 540 as keys for NFC radio operation based on type of input I/F the satellite phone 540 has. The second API and the phone feature access software add an item to the list of available features if the input I/F of the satellite phone 540 are a combination of a screen and a keypad. The user is able to operate the NFC radio 552 by selecting the added item and selecting standard keys, for example and without limitation, an ON key and an OFF key. In response to selection of the added item followed by selection of the ON key by the user, the second API interacts with the first API 556 and the first API directs the NFC radio 552 via the radio I/F 554 to start receiving or sending data from an NFC compatible device.

As a way of example the satellite phone 540 is in the vicinity of an ATM (automatic telling machine) 530 that is adapted to read signals transmitted from a NFC radio. The user desires to identify himself with the ATM 530 using user-identification information stored in a memory of the satellite phone 540. The user selects an item corresponding to the NFC radio followed by the ON key from the keypad. The second API, in response to the selection, sends the user-identification information to the first API 556. The first API forwards the user-identification information to the NFC radio 552. The NFC radio 552 sends the user-identification information to the ATM 530 via a second wireless link. The satellite radio 540 communicates with the ATM 530 over the second wireless radio via the NFC radio 552 and using NFC protocol. In the example the satellite radio 540 operates as an NFC radio for identification with the ATM 530. In another embodiment the NFC radio 552 receives data from a second NFC device when the satellite phone 540 goes within a few centimeters of the second NFC device. The first API 556 forwards the received data to the second API. The second API interacts with display I/F of the phone 540 and displays the received data on a screen of the satellite phone 540.

Figure 6:
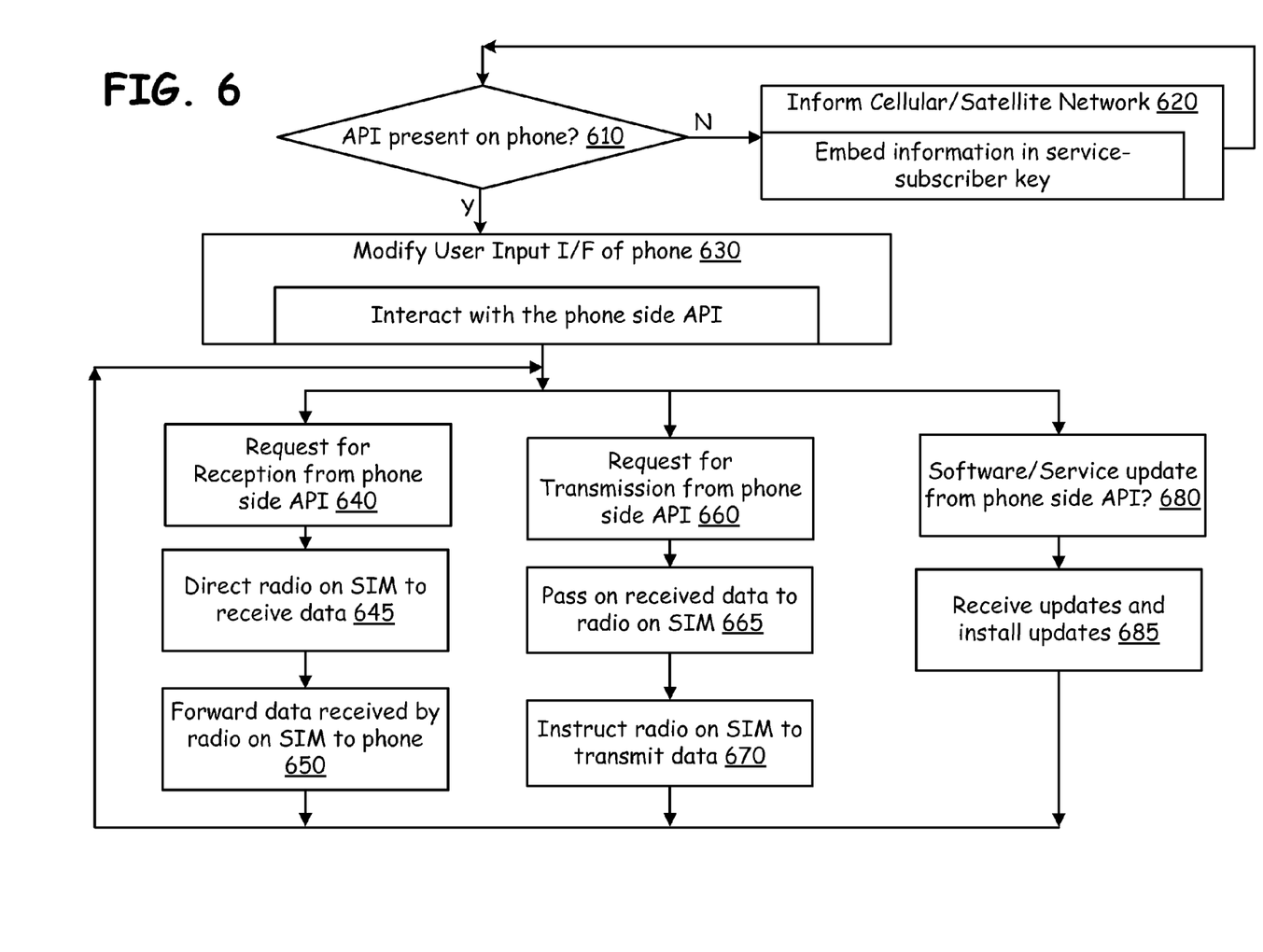
FIG. 6 is a flow chart illustrating a method of operation of an Application Program Interface (API) residing on a SIM that includes a radio wherein the API allows a phone to use the radio on the SIM when the SIM is plugged into the phone according to one or more embodiments of the present invention.

FIG. 6 is a flow chart illustrating a method of operation of an application program interface (API) residing on a SIM that includes a radio wherein the API allows a phone to use the radio on the SIM when the SIM is plugged into the phone according to one or more embodiments of the present invention. With the operations of FIG. 6, an API resides on a SIM that includes a radio wherein the API allows a phone to use the radio on the SIM when the SIM is plugged into the phone. The method begins when the SIM that includes the radio is inserted into the phone. The phone is a cellular phone, a satellite phone or any other type of a phone that uses service-subscriber key stored in the SIM to authenticate itself with a cellular network or a satellite network or any other type of a communication network prior to beginning of communication with the communication network. The API looks for a second API that is referred to a phone side API in the phone as shown in a step 610. If the API does not find the phone side API, then the API informs the cellular/the satellite/the communication network in a next step 620. The API or the SIM cannot communicate with the communication network directly. The phone is adapted to send and receive data from the communication network via a transceiver on the phone. The API embeds information regarding absence of phone side API on the phone in the service-subscriber key. The phone sends the service-subscriber key to the communication network during identification and authentication process. The communication network on receiving the service-subscriber key from the phone via the transceiver becomes aware of absence of the phone side API on the API. The communication network sends an alert message to the phone directing the phone to download and install the phone side API. The communication network may in addition send a plurality of options for retrieving the phone side API. The plurality of options is a remote web server, a local storage such as CD. If the phone is subscribed to data service, then it receives the phone side API from the remote web server via the communication network. If the phone is not subscribed to data service, the only option left is to receive the phone side API from the local storage via a computer/notebook. A computer/notebook is needed because the phone does not have a CD reader. If the local storage is a USB storage device and the phone has a USB port, then the phone can receive the phone side API directly from the USB storage device. The API referred to as SIM side API is made aware of the presence of the phone side API on the phone by the phone side API. In another embodiment the SIM side API becomes aware of the presence of the phone side when the phone side API interacts with the SIM side API for first time.

On locating the phone side API on the phone, the SIM side API modifies the user input I/F of the phone and/or adds feature(s) to the phone by interacting with the phone side API as shown in a step 630. The SIM side API does so to ensure that a user can operate the radio on the SIM via the user input I/F of the phone. The user input I/F of the phone is, for example and without limitation, a keypad, a screen, a touchpad, a touch screen etc. The phone is adapted to operate the radio on the SIM, as a way of example, on selection of keys from the keypad, on selection of items from a list of available features etc.

The SIM side API receives a request for reception from phone side API in a step 640. The SIM side API, in response to the request, directs the radio on the SIM to start receiving data from external source in a next step 645. The phone side API triggers the request, for example, by selecting a key from the keypad of the phone or by selecting an icon on a screen of the phone. The radio on the SIM is one of a Bluetooth radio, a NFC radio, a FM receiver, a GPS receiver etc. The radio on the SIM is adapted to send and receive data from a second radio via a wireless link wherein communication between the radio on the SIM and the second radio does not need subscriber authentication as opposed to mandatory subscriber authentication and identification in a cellular network or a satellite network. For example, the radio on the SIM is a NFC radio. The radio is adapted to communicate with a second NFC compatible device using NFC protocol. No single operator provides NFC service and thereby NFC radio on the SIM does not perform subscriber identification and authentication. The radio on the SIM receives the data from the external source, i.e., the NFC compatible device in pursuance to direction from the SIM side API. The SIM side API forwards the data received by the phone on the SIM to the phone side API in a next step 650. The SIM side API enables the phone to receive data from the NFC compatible device via the NFC radio on the SIM though the transceiver on the phone is not NFC compatible. Data includes one or more of an audio, video, picture, multimedia, circuit switched data, packet switched data, short message etc.

The SIM side API receives a request for transmission from the phone side API in a step 660. The SIM side API, in response to the request, receives data from the phone side API and forwards the data to the radio on the SIM in a step 665. The SIM side API directs the radio on the SIM to transmit the data in a next step 670. The SIM side API ensures that the phone is able to send data via the radio on the SIM. The SIM side API receives a software update message from the phone side API in a step 680. The software update message pertains to an update of the SIM side API or an update of services provided by the network via which the radio on the SIM receives and sends data or an update of driver software of the radio on the SIM etc. The SIM side API receives the software update from the phone side API in a next step 685. If the software update is an update of the SIM side API, then the SIM side API installs the software update.

Figure 7:
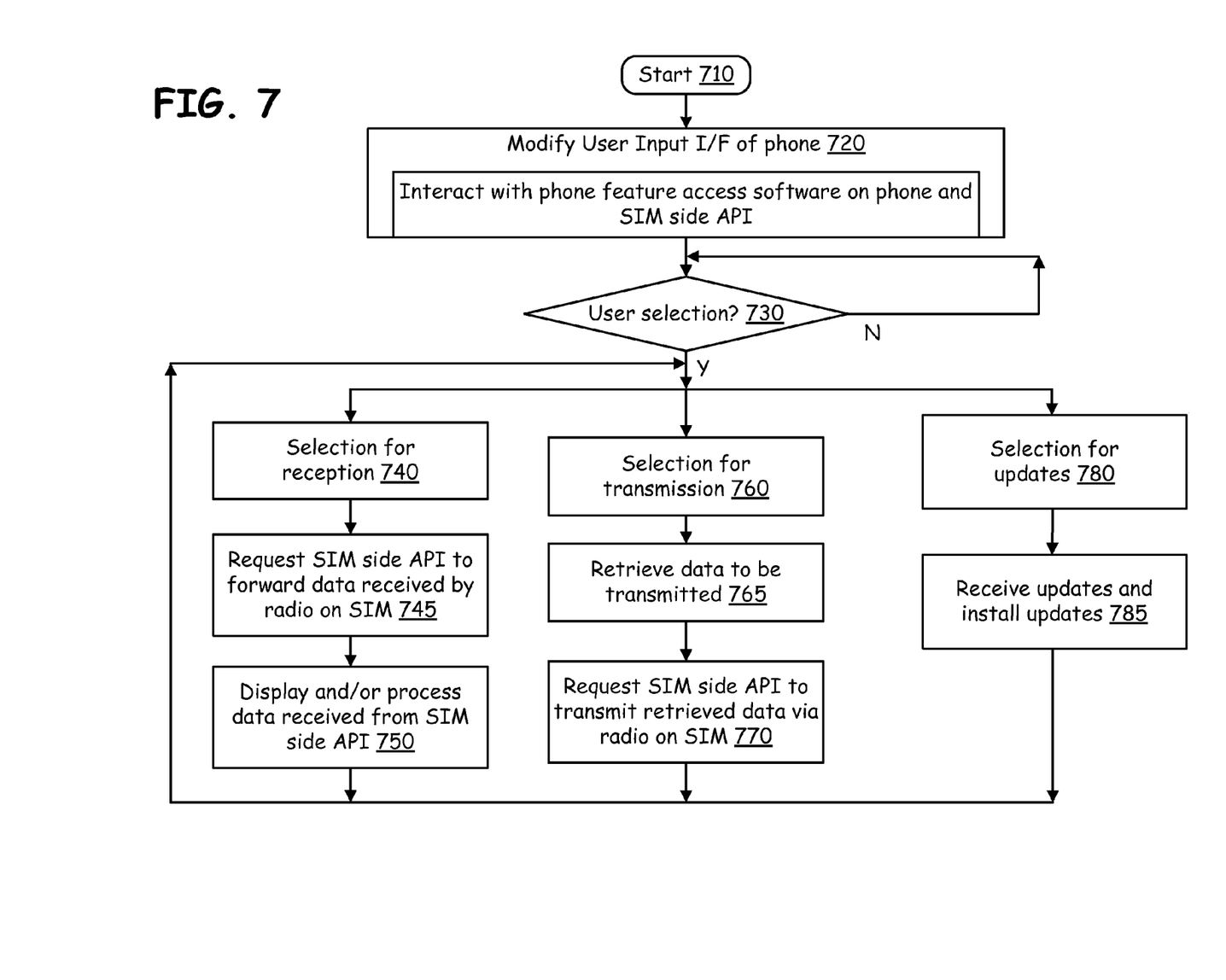
FIG. 7 is a flow chart illustrating a method of operation of an API residing on a phone that communicates via a radio on a SIM that remains plugged into the phone.

FIG. 7 is a flow chart illustrating a method of operation of an application program interface (API) residing on a phone that communicates via a radio on a SIM that remains plugged into the phone. With the embodiment of FIG. 7, the phone is a cellular phone or a satellite phone or a variety of a phone that uses a service-subscriber key stored in the SIM for identification and authentication with a cellular network or a satellite network or any of a proprietary communication network. Successful identification and authentication by the proprietary communication network allows the phone to use services provided by the communication network. The SIM remains plugged into the phone all the time except when removed for servicing, change out, etc. The phone has a transceiver that is adapted to send and receive data from the proprietary network via the transceiver. The SIM has a radio incorporated on it. The radio on the SIM is one of a FM receiver, a NFC radio, a Bluetooth radio, a GPS receiver etc. Business model of a FM radio network, Bluetooth devices, NFC devices and GPS receivers is different from the cellular/satellite network and therefore the do not use a SIM for authentication and identification unlike the cellular/satellite network.

The API residing on the phone ensures that the phone can use the radio on the SIM for communication in addition to using the transceiver on the phone for communication with the proprietary communication network as shown in a step 720. If the radio on the SIM is a Bluetooth radio, then the API on the phone ensures that the phone uses the Bluetooth radio on the SIM to communication with a Bluetooth device. The SIM has a second API, referred to as SIM side API residing on the SIM. The phone side API interacts with the SIM side API and a phone feature access software that resides on the phone to ensure that user input I/F of the phone can be used to operate and control the radio on the SIM. As a way of example the user input I/F of the phone is a screen and a keypad and the radio on the SIM is a FM receiver. The phone side API directs the phone feature access software to add an item/icon to a list of available of feature in the phone. Selection of a key from the keypad following selection of the newly added item/icon from the list of available features applies to the FM receiver on the SIM at step 730. For example, a user selects the newly added item/icon followed by an 'on' key from the keypad. The phone side API, in response to the selection, requests the SIM side API to turn on the FM receiver as shown in a step 740. The phone side API further requests the SIM side API to forward data received by the FM receiver to the phone as shown in a step 745. The SIM side API turns on the FM receiver and forwards data received by the FM receiver to the phone side API. The phone side API receives the data forwarded by the SIM side API. If the date is an audio the phone side API forwards the data to a speaker of the phone. If the data is an image the phone side API displays the data on the screen of the phone. If the data is a video the phone side API forwards the data to a multimedia player available on the phone.

For example, the radio on the SIM is a Bluetooth radio. The user selects the newly added item/icon, followed by selection of a file from a memory of the phone, followed by an 'on' key from the keypad. The phone side API, in response to three selections, retrieves the selected file from the memory of the phone, forwards the selected file to the SIM side API and requests the SIM side API to transmit the selected file via the radio on the SIM as described in steps 760, 765, 770.

The user in another example selects an item corresponding to 'update' from the list of available features at step 780. The phone side API in response to the selection requests the SIM side API to receive updates, if any, via the radio on the SIM. Updates are one or more of an update on SIM side API, update on phone side API etc. The phone side API in another embodiment retrieves the updates from the cellular/satellite network via the cellular/satellite transceiver on the phone. The updates are typically stored in a remote web server and the phone, provided the phone is subscribed to packet data service of the cellular/satellite network, retrieves the updates from the remote web server via the cellular/satellite network and using the cellular/satellite transceiver on the phone as shown in a step 785. The phone side API installs the updates and/or forwards the updates to desired destination. If the update pertains to an update for the SIM side API, then the phone side API forwards the update for SIM side API to the SIM after receiving the update via the cellular/satellite transceiver.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks/modules illustrating the performance of certain significant functions. The boundaries of these functional building blocks/modules have been arbitrarily defined for convenience of description. Alternate boundaries could be defined as long as the certain significant functions are appropriately performed. For example, functional modules illustrated may be software and/or hardware modules that perform the indicated functionality but are not limited to hardware only or software only. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication system comprising:
   a wireless phone including a user input interface, and a first wireless transceiver;
   a Subscriber Identity Module (SIM) that is plugged into the wireless phone, the SIM including storage, a second wireless transceiver and an application program interface, wherein when the application program interface does not find a phone side application program interface, the application program interface informs a wireless network via the first wireless transceiver, and in response, the wireless network directs the wireless phone to download and install the phone side application program interface;
   the wireless phone using a service-subscriber key stored in the storage of the SIM to access a plurality of services provided by the wireless network using the first transceiver according to a first communication protocol;
   the phone side application program interface, in response to a tactile user selection via a portion of a tactile user input interface, interacts with the application program interface of the SIM to operate the second wireless transceiver by at least one of: activating the second wireless transceiver, deactivating the second wireless transceiver, and tuning the second wireless transceiver; and
   the wireless phone communicates with a node using the second wireless transceiver according to a second communication protocol by way of the interaction between the phone side application program interface and the application program interface of the SIM.

2. The communication system of claim 1, wherein the wireless phone communicates with the node over a wireless link.

3. The communication system of claim 1, wherein the plurality of services provided by the wireless network include voice call service.

4. The communication system of claim 1, wherein the phone side application program interface adds an icon corresponding to the second wireless transceiver to a list of available features in the wireless phone.

5. The communication system of claim 4, wherein the phone side application program interface interacts with the application program interface of the SIM on selection of the icon.

6. The communication system of claim 1, wherein the wireless phone receives the phone side application program interface from a second storage.

7. The communication system of claim 6, wherein the second storage is a remote web server.

8. The communication system of claim 7, wherein the wireless phone retrieves the phone side application program interface from the remote web server via the wireless network using the first wireless transceiver.

9. A subscriber identity module comprising:
- a storage that stores a service-subscriber key;
- a wireless receiver that receives data from a device according to a communication protocol;
- an application program interface that enables a wireless phone to operate the wireless receiver when the subscriber identity module is plugged into the wireless phone and the application program interface does not find a counterpart application program interface in the wireless phone, the application program interface informs such lack of the counterpart application program interface so as to enable the wireless phone to download and install the counterpart application program interface; and
- phone feature controller software, wherein the application program interface and the phone feature controller software enables the wireless phone to operate the wireless receiver via a designated portion of a tactile user input interface of the wireless phone, the designated portion is operable to receive a tactile selection including at least one of: activating the wireless receiver, deactivating the wireless receiver, and tuning the wireless receiver.

10. The subscriber identity module of claim 9, wherein the subscriber identity module further comprises a wireless transmitter that transmits data to the device.

11. The subscriber identity module of claim 10, wherein the application program interface enables the wireless phone to operate the wireless transmitter when the subscriber identity module is plugged into the wireless phone.

12. The subscriber identity module of claim 9, wherein the application program interface informs the wireless network by appending a message to the service-subscriber key.

13. A method performed by a wireless phone and a subscriber identity module that is plugged into the wireless phone, the wireless phone includes a first wireless transceiver and a user input interface that is used to operate the first wireless transceiver and the subscriber identity module including a second wireless transceiver and a first application program interface, the method comprising:
- the first application program interface of the subscriber identity module causing the wireless phone to retrieve a second application program interface and install the second application program interface on the wireless phone;
- the second application program interface of the subscriber identity module interfaces with a portion of the user input interface to operate the second wireless transceiver of the subscriber identity module, wherein the user input interface is a tactile user interface and the portion is operable to receive a tactile selection including at least one of: activating the second wireless transceiver, deactivating the second wireless transceiver, and tuning the second wireless transceiver; and
- the first application program interface of the subscriber identity module enabling communication via the second wireless transceiver in response to the tactile selection of the portion of the user input interface.

14. The method of claim 13 further comprising receiving the second application program interface via the first wireless transceiver.

15. The method of claim 13 further comprising receiving updates of the first application program interface and updates of the second application program interface via the first wireless transceiver.

* * * * *